United States Patent
Yen

(10) Patent No.: US 9,973,033 B1
(45) Date of Patent: May 15, 2018

(54) SMART EMERGENCY LIGHT

(71) Applicant: Chih Chien Yen, Taipei (TW)

(72) Inventor: Chih Chien Yen, Taipei (TW)

( * ) Notice: Subject to any disclaimer, the term of this patent is extended or adjusted under 35 U.S.C. 154(b) by 0 days. days.

(21) Appl. No.: 15/412,068

(22) Filed: Jan. 23, 2017

(51) Int. Cl.
G08B 17/00 (2006.01)
H02J 9/02 (2006.01)
H05B 37/02 (2006.01)
H02J 7/00 (2006.01)
G08B 17/10 (2006.01)

(52) U.S. Cl.
CPC .............. H02J 9/02 (2013.01); G08B 17/10 (2013.01); H02J 7/0068 (2013.01); H05B 37/0209 (2013.01)

(58) Field of Classification Search
CPC .......... G08B 17/10; B60Q 3/0293; H02J 9/02
USPC ........ 340/628, 630, 632, 506, 631, 540, 651
See application file for complete search history.

(56) References Cited

U.S. PATENT DOCUMENTS

| | | | |
|---|---|---|---|
| 9,472,955 B2* | 10/2016 | Jones | H02J 4/00 |
| 2006/0176167 A1* | 8/2006 | Dohrmann | G08B 25/001 340/506 |
| 2013/0147376 A1* | 6/2013 | Trainor | H02J 9/065 315/200 R |
| 2015/0283942 A1* | 10/2015 | Hessling Von Heimendahl | B60Q 3/0293 307/9.1 |

* cited by examiner

*Primary Examiner* — Tai T Nguyen

(57) ABSTRACT

A smart emergency light comprises a microprocessor; a power switch connected to the microprocessor; a power supply connected to the power switch; a chargeable battery connected to the power supply; a light source driver connected to the power supply and the chargeable battery and controlled by the microprocessor; an illumination device connected to the light source driver and controlled by the light source driver; and a network module connected to the microprocessor so that the smart emergency light is connectable to a center computer; wherein the center computer controls the smart emergency light through the microprocessor.

7 Claims, 2 Drawing Sheets

SMART EMERGENCY LIGHT

FIELD OF THE INVENTION

The present invention is related to illuminations, and in particular to a smart emergency light.

BACKGROUND OF THE INVENTION

With the progress of technology, buildings become higher and higher with larger and larger areas. When emergency accidents occur, electric power is possibly interrupted and therefore, many buildings are installed emergency lights for providing power in the power interruption state.

The emergency lights serves to provide illumination for providing guiding to assist the people to run away from the accident area. However, if the emergency lights are not used for a long time, they are possible destroyed to induce troubles and people's injuries and death toll increase. Therefore, to avoid destroy of the illumination system, complicated maintenance and repairing works are needed, but these works will greatly increase the cost and work of labors.

Therefore, there is an eager demand for a proper emergency light system which can effectively reduce accidents and reduce the injuries and death of people when accidents occurs. Furthermore, it is required that the maintenance work is easy and effective. This will increase the safety of a building.

SUMMARY OF THE INVENTION

Accordingly, to improve above said defects in the prior art, the present invention provide a smart emergency light, in that: the smart emergency light of the present invention provides the function of emergency illumination, indoor positioning, smart discharging and charging of batteries, smart run away indication, etc. Furthermore, the smart emergency light of the present invention further provides functions of wireless broadcasting, smoke detection, and temperature detection which use the wires and devices of the smart emergency light in the building. No extra wiring is needed. The present invention provides a safe and comfortable environments to people at normal time or when emergency occurs.

To achieve above object, the present invention provides a smart emergency light comprises a microprocessor; a power switch connected to the microprocessor; a power supply connected to the power switch; a chargeable battery connected to the power supply; a light source driver connected to the power supply and the chargeable battery and controlled by the microprocessor; an illumination device connected to the light source driver and controlled by the light source driver; and a network module connected to the microprocessor so that the smart emergency light is connectable to a center computer; wherein the center computer controls the smart emergency light through the microprocessor.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
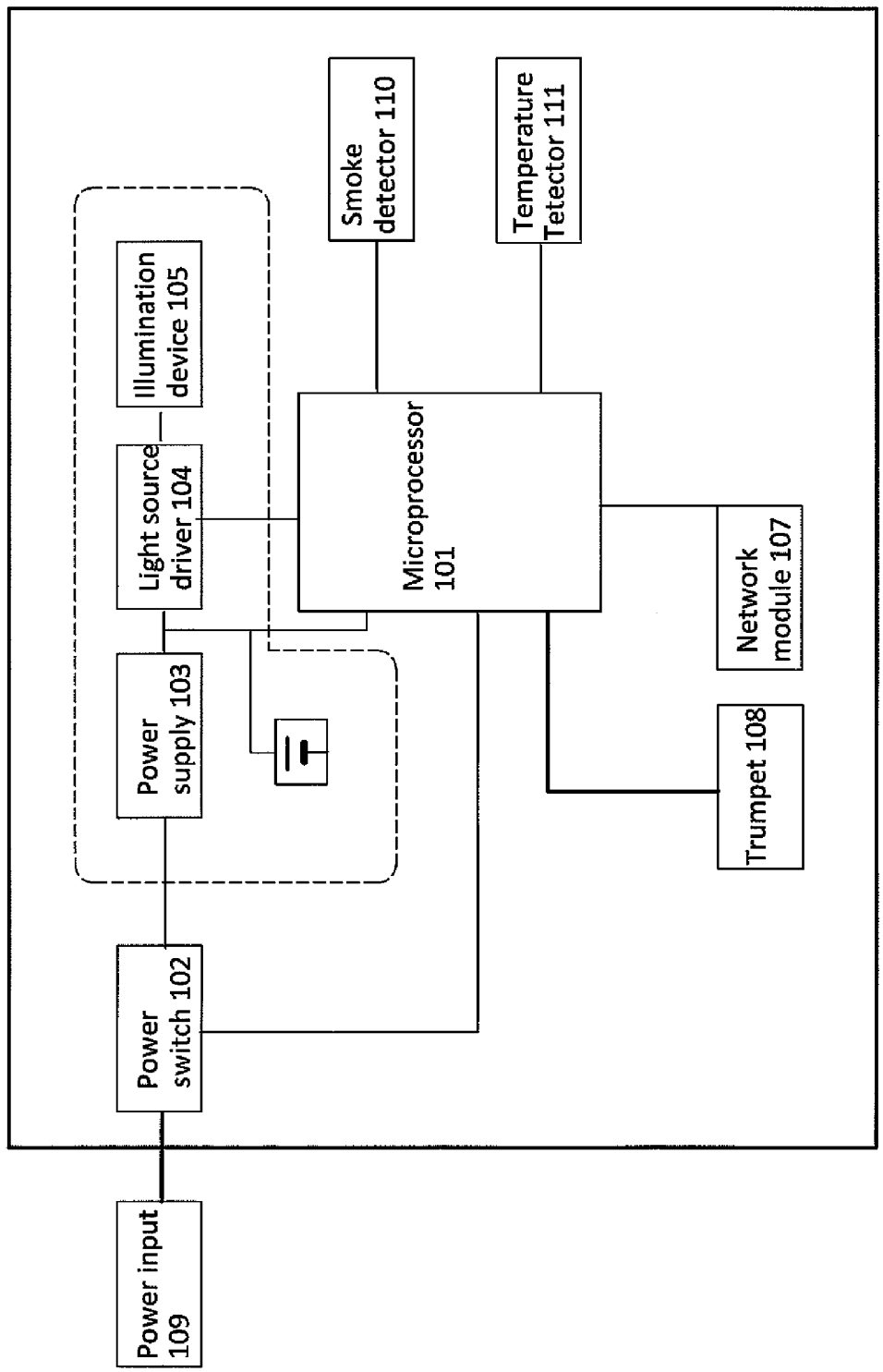
FIG. 1 is a schematic view showing the function block diagram of the present invention.

Referring to FIG. 1, the structure of the present invention is illustrated. The smart emergency light 100 of the present invention includes a microprocessor 101, a power switch 102, a power supply 103, a chargeable battery 106, light source driver 104, and an illumination device 105.

The power switch 102 is connected to the microprocessor 101. The power supply 103 is connected to the power switch 102. Therefore the microprocessor 101 can control the power switch 102 for further controlling the power supply 103 to supply power used in all the smart emergency light 100.

The chargeable battery 106 is connected to the power supply 103 for power charging. Furthermore, when a power input 109 (such as an AC power input) is interrupted, or the power switch 102 is interrupted by the microprocessor 101 so that the power input 109 cannot supply power to the power supply 103, the chargeable battery 106 can supply power to the smart emergency light 100.

A light source driver 104 is connected to the power supply 103 and the chargeable battery 106. The illumination device 105 is connected to the light source driver 104 and is controllable by the light source driver 104 for controlling illumination, time, light color, etc. thereof. The microprocessor 101 can control the illumination, time, light color, etc. of the illumination device 105 through the microprocessor 101 effectively. The illumination device 105 may be light emitting diodes (LEDs), fluorescent lights, and other light sources. The light source driver 104 is corresponding to the kind of the light source, such as an LED driver or a fluorescent light driver, etc. However, all these are within the scope of the present invention.

The smart emergency light 100 of the present invention further comprises a network module 107 which is connected to the microprocessor 101. The network module 107 serves to receive external wireless signals out of the smart emergency light 100 through the microprocessor 101 for controlling the smart emergency light 100. Furthermore, the network module 107 serves to transfer the parameters and messages of the smart emergency light 100. The network module 107 may contain a wired network module, a Bluetooth module, or a WiFi module, or other wired or wireless transferring modules.

Figure 2:
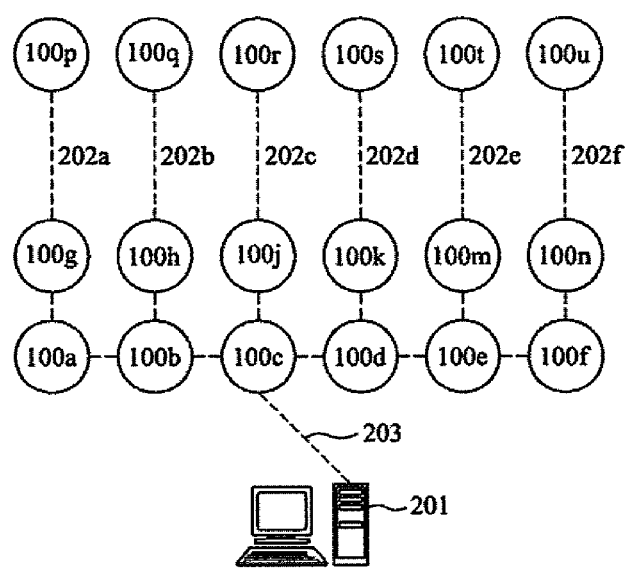
FIG. 2 shows the smart emergency lights and the network connecting the smart emergency light.

With reference to FIG. 2, in the drawing, a plurality of smart emergency lights 100a to 100u are connected as a networks through the networks 202a to 202f and the network 203, which are connected through a central computer 201. The networks through the networks 202a to 202f and the network 203 may be wired or wireless networks, for example, Bluetooth networks.

For big areas or high buildings, a plurality of smart emergency lights 100 are used which are connected to the center computer 201 through the network module 107. Therefore the center computer 201 may control the plurality of smart emergency lights 100 through the microprocessor 101.

When an emergency event occurs, such as a fire alarm in the network 202a, the center computer 201 may control all the smart emergency lights 100. For example, the center computer 201 closes the smart emergency lights 100a, 100g, and 100p in that area having the fire accident and meanwhile the smart emergency lights 100 at other safe area is opened for guiding people to leave the accidental area to a safe place. Therefore people can run to the area along safe paths instead of entering into the dangerous area. Furthermore, the smart emergency lights 100 can flash to guide people to run away. All these are within the scope of the present invention.

Beside, by the distribution of the smart emergency light 100 in a building, the network module 107 may be the combination of wired and wireless devices and emit address signals periodically for providing the function of indoor positioning and navigation for handhold devices or auto devices for increasing the positioning functions of other devices within a building.

Besides, the microprocessor 101 may be used to test the normality of the chargeable battery 106 and the power input 109 at setting times, for example, to close the power switch 102 at a setting time period, such as 5 to 15 minutes so that the smart emergency light 100 illuminate at the setting time. Then residue power of the chargeable battery 106 is measured so as is to determine the status of the chargeable battery 106, or to charge or discharge the chargeable battery 106 of the smart emergency light 100 at a setting time period.

By combining the center computer 201 for controlling, the smart emergency light 100 can receive instructions from the center computer through the network module 107, and then using the microprocessor 101 to test the normality of the chargeable battery 106 and the power input 102. Furthermore, according to the instructions of the center computer 201, the microprocessor 101 controls the sequence of charging and discharging of the chargeable battery 106 to avoid the state that too much chargeable batteries 106 discharge simultaneously so as to effect emergency illumination.

Besides, when emergency occurs, the microprocessor 101 of the smart emergency light 100 can adjust the illumination of the illumination device 105 stage by stage. For example, at a first 20 minutes from occurrence of an emergency, the illumination device 105 is at full illumination; at a second 20 minutes, the illumination is reduced to 50%; and at a third minutes, the illumination is further reduced to 25%. That is, at the initial time, the smart emergency light 100 can provide a maximum illumination. The reduction of the illumination can prolong the illumination time of the smart emergency light 100.

The smart emergency light 100 further comprises a trumpet 108. When emergency occurs, the trumpet 108 can provide a wireless broadcasting effect. No extra wire is needed.

The smart emergency light 100 further comprises a smoke detector 110 for smoking detection and transfers the detection result back to the center computer 201. No extra wire is used. Using current smart emergency light 100 has the function of alert of fire alarm.

Besides, the smart emergency light 100 further comprises a temperature detector 111 for detecting temperature and transfers the detection result back to the center computer 201 for controlling temperature of air conditioners or for determining whether a fire accident occurs.

Therefore the smart emergency light 100 of the present invention provides the function of emergency illumination, indoor positioning, smart discharging and charging of batteries, smart run away indication, etc. Furthermore, the smart emergency light of the present invention further provides functions of wireless broadcasting, smoke detection, and temperature detection which use the wires and devices of the smart emergency light in the building. No extra wiring is needed. The present invention provides a safe and comfortable environments to people at normal time or when emergency occurs.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:
1. A smart emergency light comprising:
a microprocessor;
a power switch connected to the microprocessor;
a power supply connected to the power switch;
a chargeable battery connected to the power supply;
a light source driver connected to the power supply and the chargeable battery and controlled by the microprocessor;
an illumination device connected to the light source driver and controlled by the light source driver; and
a network module connected to the microprocessor so that the smart emergency light is connectable to a center computer;
wherein the center computer controls the smart emergency light through the microprocessor;
the microprocessor tests the chargeable battery and power input to determine whether the chargeable battery and the power input are normally operated;
wherein the network module receives instructions from the center computer to the microprocessor to test the chargeable battery and power input to determine whether the operations of the chargeable battery and the power input is normally operated;
emergency accidents occur, the illumination of the illumination device are adjusted stage by stage.

2. The smart emergency light as claimed in claim 1, further comprising a trumpet for emitting voices as an emergency accident occurs.

3. The smart emergency light as claimed in claim 1, further comprising a smoke detector for detecting smoke and reporting detection result to the center computer.

4. The smart emergency light as claimed in claim 1, further comprising a temperature detector for measuring temperature and reporting detection result to the center computer.

5. The smart emergency light as claimed in claim 1, wherein the network module includes a wireless module which emits address signals at setting times for positioning indoors.

6. The smart emergency light as claimed in claim 1, wherein the network module transfers instructions from the center computer to the microprocessor for controlling illumination of the illumination device.

7. The smart emergency light as claimed in claim 1, wherein the network module is connected to other smart emergency light so as to form a network.

* * * * *